(12) United States Patent
Vanhoutte

(10) Patent No.: US 9,572,299 B2
(45) Date of Patent: Feb. 21, 2017

(54) BALE DISCHARGE

(71) Applicant: CNH Industrial America LLC, New Holland, PA (US)

(72) Inventor: Peter Vanhoutte, Varsenare (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/903,755

(22) PCT Filed: Jul. 8, 2014

(86) PCT No.: PCT/EP2014/064639
§ 371 (c)(1),
(2) Date: Jan. 8, 2016

(87) PCT Pub. No.: WO2015/004147
PCT Pub. Date: Jan. 15, 2015

(65) Prior Publication Data
US 2016/0150734 A1     Jun. 2, 2016

(30) Foreign Application Priority Data

Jul. 9, 2013   (BE) .................................. 2013/0480

(51) Int. Cl.
*A01F 15/08*   (2006.01)
*A01F 15/14*   (2006.01)

(52) U.S. Cl.
CPC ........... *A01F 15/0875* (2013.01); *A01F 15/14* (2013.01)

(58) Field of Classification Search
CPC ........................... A01F 15/0875; B30B 9/3014
USPC .. 100/7, 188 R, 191, 218; 56/341, 343, 361, 56/474; 414/111, 497, 509, 511, 512, 517
See application file for complete search history.

(56) References Cited

U.S. PATENT DOCUMENTS

| | | | |
|---|---|---|---|
| 6,134,870 A | 10/2000 | Lippens et al. | |
| 6,478,523 B1 * | 11/2002 | Meijer | A01D 85/005 414/111 |
| 7,584,696 B2 | 9/2009 | Verhaeghe et al. | |
| 8,522,677 B2 * | 9/2013 | Lammerant | A01F 15/0875 100/188 R |
| 8,539,878 B2 | 9/2013 | Verhaeghe et al. | |
| 9,066,472 B2 | 6/2015 | Vandamme | |

FOREIGN PATENT DOCUMENTS

| | | |
|---|---|---|
| DE | 102006051622 A1 | 5/2008 |
| EP | 0771522 A1 | 5/1997 |

* cited by examiner

*Primary Examiner* — Jimmy T Nguyen
(74) *Attorney, Agent, or Firm* — Patrick M. Sheldrake

(57) ABSTRACT

A bale discharge for an outlet of a baling chamber of an agricultural baler has a first segment and a second segment that are moveable between an extended operating position and a retracted transporting position, wherein a support structure is provided for supporting, in the retracted position, a component of the second segment, wherein the support structure includes a first protrusion and a second protrusion.

14 Claims, 3 Drawing Sheets

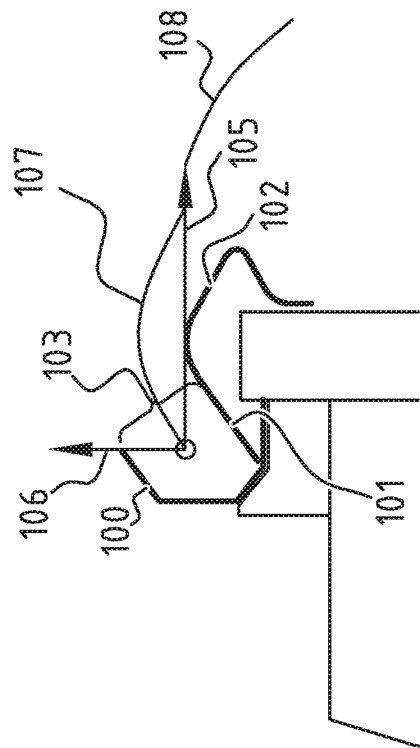
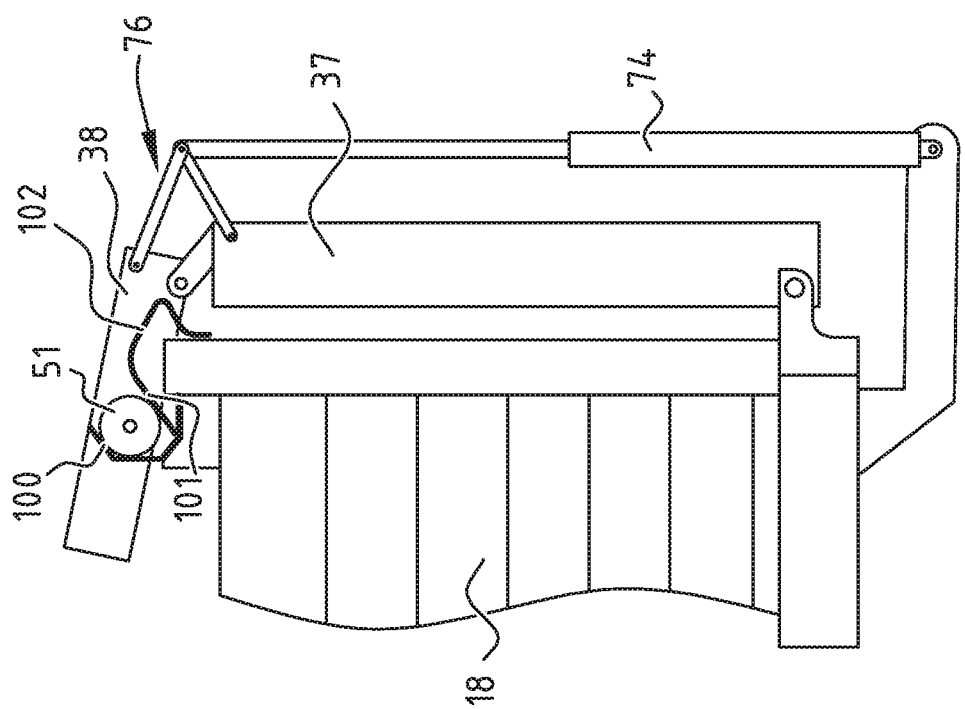
FIG. 4
FIG. 3

BALE DISCHARGE

This application is the US National Stage filing of International Application Serial No. PCT/EP2014/064639 filed on Jul. 8, 2014 which claims priority to Belgian Application BE2013/0480 filed Jul. 9, 2013, each of which is incorporated herein by reference in its entirety.

FIELD OF THE INVENTION

The present invention relates to agricultural balers for picking up crop material such as hay or straw from the field and forming it into rectangular packages. More particularly the invention relates to means installed at the rear of the machine for receiving the formed package and depositing the same onto the field.

BACKGROUND OF THE INVENTION

Conventionally, agricultural balers comprise a frame which is travelled on a pair of wheels over a field for picking up therefrom hay, straw or silage grass and feeding such crop material to a baling chamber in which it is compressed to parallelepiped packages under action of a plunger which reciprocates inside the baling chamber. When the packages have reached a predetermined length a tying mechanism is operated to encircle the completed package with a plurality of strands to form a finished bale which will be ejected out of the baler.

As the outlet of the baling chamber is at a substantial height above the field, there is a risk that bales get damaged by their fall from the baling chamber, e.g. because the impact breaks some or all of the strands. Commonly this problem has been solved by providing a guide or slide means at the exit of the baling chamber for reducing the height from which the bale is released onto the field and/or giving a wanted orientation to the bale. In the art such apparatus usually is referred to as "bale chute" or "bale discharge means".

It has been observed that while manoeuvring on a field, the tail portion constituted by the bale chute is particularly vulnerable to damages caused by collisions with objects on or around the field. In particular the previously deposited bales may form serious obstacles while the baler is driven backwards, e.g. to realign the pick-up to the windrow. When the baler is driven backwards the bale chute may hit the bale on the ground and the impact may seriously deform this chute to the extent that it becomes impossible to use.

Furthermore when an agricultural baler is transported from one place to another, more often than not via public roads, the tail portion of the baler significantly increases the length of the baler. In an attempt to solve this drawback, prior art balers are provided with bale discharge means that are mounted in an extendable manner. This allows the discharge means to be moved between an extended operating position and a retracted transporting position. In a further attempt to facilitate use of such extendable discharge means, the latter can be provided with automatic extending means (for example in the form of an actuator). Via this automatic extending means, the discharge means can be automatically moved between the extended operating position and the retracted transporting position. Such a baler is known from EP 0 974258. The capability of automatically moving the discharge means from one to another position will tend the baler operator to make frequent use of this feature. As a result, the operator will retract the discharge means any time these means are not required for the operation of the baler, thereby driving with retracted discharge means more often. As a result, the frequency of driving the baler with the discharge means in the retracted position significantly increases. For example where a baler with manual discharge means is only driven with retracted discharge means on public roads, an operator might choose to retract the discharge means (automatically) when driving on the field or on a lane.

A drawback of the existing systems is that, where the bale discharge means have been dimensioned to be used in the retracted position when driving on public roads, the discharge means prove to be not strong enough for frequent driving in this retracted position. Particularly when the baler is driven on a field or on a lane (which is typically more uneven than a public road), the discharge means can swing open.

Tests have shown that, when an agricultural baler is driven over an uneven ground surface and when the bale discharge means are in the retracted position, the bale discharge means tend to move out of this retracted position into the extended operating position. In practice, the segments of the bale discharge means will swing open due to the vibrations of the agricultural baler, whereby the swing is further powered by the gravity forces. The swinging forces appear to be larger than the forces that can be born by typically used automatic extending means. In such situation, the automatic extending means fail to keep discharge means in the retracted position, and the discharge means will swing open to the operating position. It will be clear that such a situation is highly dangerous.

SUMMARY OF THE INVENTION

It is an object of the present invention to provide a bale discharge means that can be kept in the retracted transporting position even when the agricultural baler is driven over an uneven ground surface.

To this end the agricultural baler according to the invention comprises:
a baling chamber;
pick-up means for collecting crop material from a field and feeding it via conveyor means into said baling chamber;
means for compressing the crop material in said baling chamber into a package;
tying means for encircling the package with one or more strands of tying material thereby forming a completed bale; and
bale discharge means arranged at an outlet of the baling chamber for receiving said completed bale, the bale discharge means comprising a first segment one end of which is rotatably connected to the baling chamber, and an opposite end of which is rotatably connected to a second segment of the bale discharge means such that the bale discharge means is moveable between an extended operating position and a retracted transporting position,
wherein the bale discharge means further comprises a support structure for supporting, in said retracted position, a component of said second segment, wherein said support structure comprises a first protrusion provided for preventing, in said retracted position, rotation of said first segment with respect to said baler, characterized in that said support structure further comprising a second protrusion provided for preventing, in said retracted position, rotation of said second segment with respect to said first segment.

The support structure is provided to keep the bale discharge means in the retracted position. To this end, the support structure comprises a protrusion prohibiting rotation of the first segment with respect to the baling chamber. A further protrusion is provided to prevent rotation of the second segment with respect to the first segment. The combination of these two protrusions prevent both the first segment and the second segment from rotating under influence of external forces. This allows to keep the discharge means in the retracted position even when the baler is driven over an uneven ground surface. The external forces that are transmitted to the discharge means as a result of driving over uneven ground surface, cannot rotate the second segment with respect to the first segment, and also cannot rotate the first segment with respect to the baler, and thereby the discharge means is kept in the retracted position. Typically driving the baler on uneven groundsurface will result in upward forces that generally apply only to the second segment of the discharge means. However rotation of this second segment is prohibited by the second protrusion.

Where discharge means of prior art balers might show a protrusion preventing the first segment to rotate with respect to the baler, they fail to disclose a support structure with the combination of protrusions as is proposed in the present invention. With only one protrusion, external forces can start rotation of one of the segments (in practice more the second segment) thereby starting movement of the discharge means towards the extended position. Such start of rotation of one of the segments often compromises the function of the prior art support structure so that the discharge means move out of the retracted position. Therefore, the combination of protrusions as proposed in the invention allow the discharge means to be kept in the retracted position when the baler is driven over uneven ground surfaces.

Preferably an opening is defined between the first protrusion en the second protrusion, the opening being provided so that the component can enter and exit the support structure by a combined rotation of the first and second segment. A combined rotation of the first and second segment requires application of one specific predetermined force in a specific direction. Chances that this one predetermined force in the specific direction occurs when a baler is driven over an unequal ground surface are minimal. Even if such situation would occur, chances that the discharge means will move out of the retracted position are still small, particularly when an automatic extending means as described above, is provided. Mainly the automatic extending means is provided to apply a first force. A part of this first force is applied to the first segment to rotate with the first segment with respect to the baling chamber. A further part of the first force is applied to the second segment to rotate the second segment with respect to the first segment. However the one predetermined force that is required to simultaneously move the first segment and the second segment (to move the component through the opening of the support structure) is countered by the full first force applied by the actuator.

Preferably a combined rotation is a simultaneous rotation of on the one hand the first segment with respect to the baling chamber and on the other hand the second segment with respect to the first segment. A simultaneous rotation of the first and the second segments requires a specific external force to be applied. Furthermore, such simultaneous rotation of first and second segment can be countered by automatic extending means more easily than a movement of only one of the first and second segment.

Preferably the second segment comprises rollers provided for facilitating movement of the completed bale over the bale discharge means. The rollers allow a completed bale to be ejected from the baling chamber, and placed on the ground surface, in a smooth manner. Namely, rollers tend to minimize friction between the discharge means and the bale.

Preferably the component is formed by at least one of the rollers, preferably by the most distal roller of the rollers. Since the rollers are already a part of the bale discharge means, these rollers can be provided with a double function by using one of these rollers to be supported by the support structure. Furthermore, a roller will tend to roll into the support structure without significant friction (due to the rolling).

Preferably the first segment comprises further rollers provided for facilitating movement of the completed bale over the bale discharge means.

Preferably the support structure further comprises a guiding surface for guiding the component towards the opening when the bale discharge means is moved from the extended to the retracted position. The guiding surface thereby facilitates entering of the component through the opening and into the support structure. The guiding surface guides the movement of the component towards the support structure, typically near the end of the movement, towards the correct position.

Preferably the bale discharge means further comprises an actuator extending between the baling chamber and the first segment, the actuator being adapted for moving at least the first segment from the extended position into the retracted position and vice versa. Further preferably the actuator is connected to the second segment from the extended position into the retracted position and vice versa. In the present invention, the actuator serves two purposes. The first purpose is to automatically move the discharge means from the retracted position to the extended position and from the extended position to the retracted position. The other purpose is to prevent the discharge means that are in the retracted position with the component resting on or in the support structure, to move out of the support structure past the first and second protrusion. This is achieved by the actuator being connected to the baling chamber, first segment and second segment. The skilled person is familiar with lever mechanisms that are suitable for such connection.

Preferably the support structure is arranged at an upper zone of the baling chamber. Thereby, the discharge means are held at the location where the forces necessary for rotating the segment are minimum. In general, the closer to the hinge point, the higher the forces required for inducing a rotational movement (torque force). Since the first segment is typically hinged to the baling chamber at a lower end of the baling chamber, it is advantageous to provide the support structure at the upper zone of the bale chamber.

Preferably the support structure is generally formed as a U-shape, the two legs of the U-shape forming the first and second protrusions, the U-shape being oriented such that a rotation of only one of the first and second segment fails to move the component through the opening of the U-shape. A U-shape is simple in construction and can therefore be used as a support structure without thereby significantly increasing production costs of the baler.

The invention further relates to a bale discharge means for a agricultural baler, whereby the bale discharge means comprises the above described features.

BRIEF DESCRIPTION OF THE DRAWINGS

The invention will now be described in more details with respect to the drawings illustrating some preferred embodiments of the invention. In the drawings:

FIG. 3 shows a bale discharge means in a retracted position; and

FIG. 4 shows a support structure for supporting a component of the bale discharge means in the retracted position.

In the drawings a same reference number has been allocated to a same or analogous element.

The terms "front", "rear", "forward", "rearward", "left" and "right" used throughout this description are determined with respect to the normal direction of travel of the machine in operation. However they are not to be construed as limiting terms.

DETAILED DESCRIPTION OF PREFERRED EMBODIMENTS

Figure 1:
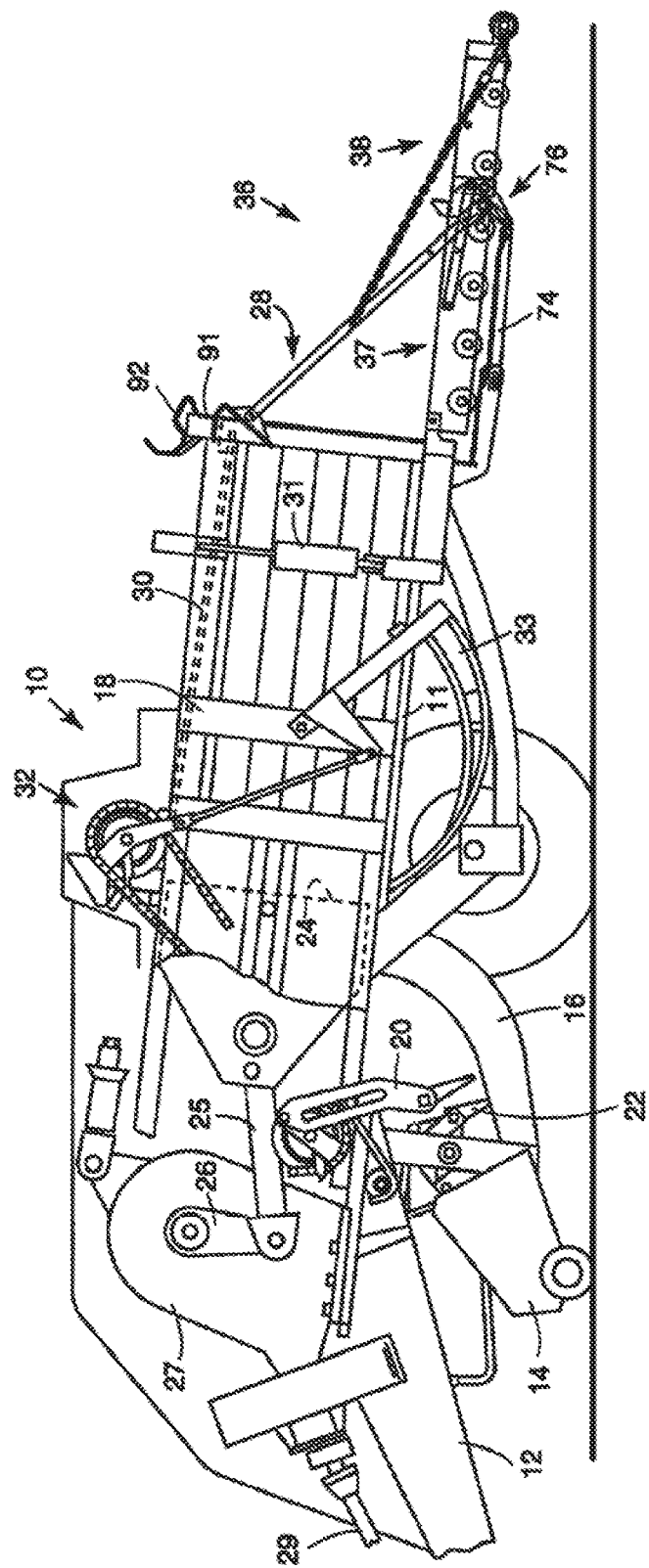
FIG. 1 shows a schematic representation of an agricultural baler with bale discharge means in the extended position.

FIG. 1 shows an agricultural baler 10 comprising a frame 11 which is equipped with a forwardly extending tongue 12 provided with hitch means (not shown) at its front end for coupling the baler 10 to a towing tractor. A conventional pick-up assembly 14 lifts windrowed crop material off the field as the baler 10 is travelled thereover and delivers such material into the front end of a rearwardly and upwardly curved, charge-forming feeder duct 16. The duct 16 communicates at its upper end with an overhead, fore-and-aft extending baling chamber 18 into which crop charges are loaded by a cyclically operating stuffer mechanism 20. A continuously operating packer mechanism 22 at the lower front end of the feeder duct 16 continuously feeds and packs material into the duct 16 as to cause charges of the crop material to take on and assume the internal configuration of the duct 16 prior to periodic engagement by the stuffer 20 and insertion up into the baling chamber 18. The feeder duct 16 may be equipped with means for establishing whether a complete charge has been formed therein and operating the stuffer 20 in response thereto. Each action of the stuffer 20 introduces a "charge" or "flake" of crop material from the duct 16 into the chamber 18.

A plunger 24 reciprocates in a fore-and-aft direction within the baling chamber 18 under action of a pair of pitman rods 25 which are linked to the crank arms 26 of a gearbox 27 rotated by a shaft 29 which is connected to the PTO shaft of the tractor. The reciprocating plunger 24 pushes each new charge introduced into the baling chamber 18 rearwardly and forms the subsequent charges into a package of crop material, which is pushed by the plunger 24 toward a rearmost discharge aperture 28 of the chamber 18.

The baling chamber 18 comprises at least one movable wall portion 30 of which the position can be adjusted to vary the cross section of the aperture 28. Reduction of this cross section will increase the resistance to rearward movement of the crop packages and hence the density of the crop material contained therein. Similarly an increase in cross section will reduce the resistance and the density of the newly formed packages. The position of the wall portion 30 is controlled by a pair of actuators in the form of hydraulic cylinders 31 (only one shown in FIG. 1) which are installed between the frame 11 and the wall portion 30.

Each package is securely bound in its final compacted form by a tying mechanism 32 before leaving the confines of the baling chamber 18. The length of each bale produced by the baler 10 can be adjustably predetermined by conventional means not shown. The tying mechanism 32 comprises a series of periodically actuated needles 33 which are normally stationed in a stand-by condition below the chamber 18 but which, when actuated, swing upwardly through and across the baling chamber 18 to present twine to a corresponding series of knotters positioned on top of the chamber 18 and extending across the width of the latter.

Figure 2:
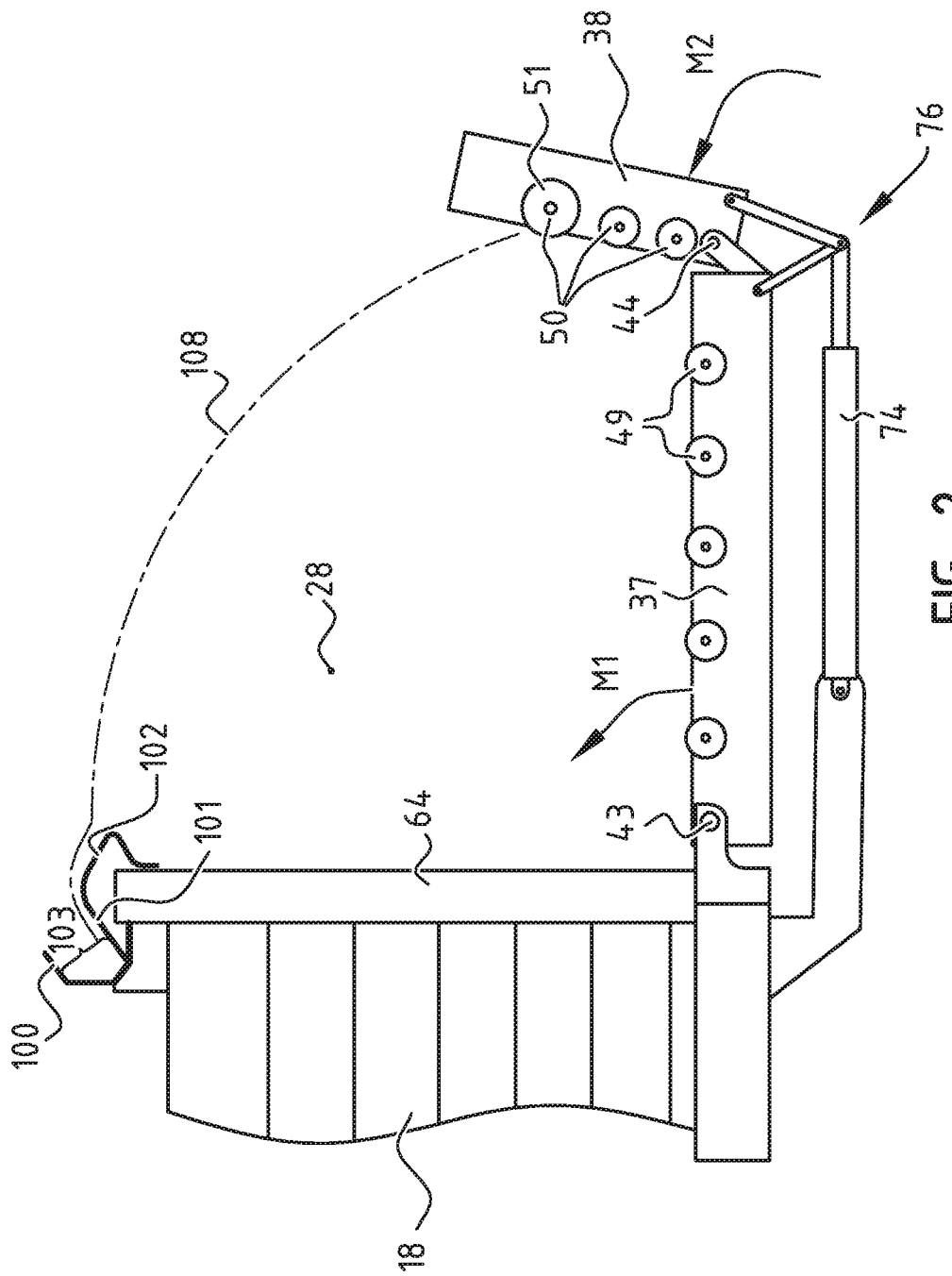
FIG. 2 shows a bale discharge means in an intermediate position.

The baler is equipped with bale discharge means 36, also referred to as a bale chute, mounted to the rear of the frame 11, adjacent the discharge aperture 28 of the baling chamber 18. Thereby the discharge means is arranged at the outlet of the baling chamber 18. The discharge means 36 is preferably provided such that the completed bale can be received thereon and sustained thereby at least until the bale has completely left the confines of the baling chamber 18. The discharge means comprises a front, first segment 37 and a rear, second segment 38. The front segment 37 comprises a rectangular frame which is attached by a pair of pivot pins 43 to the rear end of the baler frame 11. In turn, the rear segment 38 comprises a rectangular frame which is mounted via a pair of pivot pins 44 onto the rear end of the front segment frame.

Where FIG. 1 shows the bale discharge means 36 in the extended, operating position, FIG. 2 shows the bale discharge means in an intermediate position and FIG. 3 shows the bale discharge means in a retracted, transporting position. In the extended, operating position the first segment 37 and second segment 38 of the bale discharge means extend substantially parallel to the direction of movement of the bale in the baling chamber. Thereby, the bale moving out of the baling chamber can smoothly be transferred onto the bale discharge means. In the intermediate position as shown in FIG. 2, the second segment 38 of the bale discharge means 36 is rotated about ninety degrees upwards thereby bringing this second segment 38 in the retracted position. It will be clear to a skilled person that the intermediate position as is shown in FIG. 2 is only one of multiple possible intermediate positions where the bale discharge means (formed by both first and second section 37, 38) is somewhere between the extended and the retracted position. FIG. 3 shows the bale discharge means in the retracted, transporting position. Thereby, both the first segment 37 and the second segment 38 of the bale discharge means are rotated about ninety degrees upwards in such a manner that the bale discharge means is retracted. In the retracted position, a component of the second segment 38 of the bale discharge means is supported by support structure 92.

The bale discharge means 36 preferably comprises an actuator 74 that is adapted to automatically move the bale discharge means from the retracted position to the extended position and vice versa. In the example shown in the figures, the actuator is mounted below the first segment 37, between a support that is connected to the rear end of the baler frame 11, and a lever arrangement 76. Preferably, the actuator is an hydraulic actuator. The lever arrangement is preferably connected to both the first segment 37 and the second segment 38 of the bale discharge means in such a manner that operating the actuator will induce a rotational force to both the first segment 37 and the second segment 38 of the bale discharge means. In this manner, one actuator 76 can be used to rotate the two segments 37, 38 of the bale discharge means. The skilled person, reading the above description, and considering the lever arrangement that is schematically shown in the figures, will understand the effect that is to be achieved (rotation of two segments via one actuator), and will be able to design a lever arrangement as is shown, or an alternative lever arrangement having the same effect. Since this lever is known to the skilled person, it is not further described in more detail.

In the present description, a rotation of the first segment 37 is defined as a relative movement of the first segment 37 with respect to the baling chamber around pivot point 43, which movement is illustrated in FIG. 2 with the arrow M1. It will be understood by the skilled person that such rotation of the first segment 37 also implies a movement of the second segment 38 with respect to the baling chamber 18, however this movement is not considered rotation of the second segment 38. Rotation of the second segment 38 is defined as relative rotation of the second segment 38 with respect to the first segment 37 around pivot point 44, the rotation being indicated in FIG. 2 with arrow M2. Movement of the discharge means 36 from the retracted to the extended position and vice versa requires a rotation of both the first segment 37 and the second segment 38.

The first and second segment preferably comprise rollers 49, 50 extending over substantially the complete width of the discharge means. The rollers 49, 50 facilitate the movement of the completed bale over the discharge means by minimizing the friction between the discharge means and the bale. A roller 51 (preferably a middle roller) of the second segment 38 preferably functions as the component of the second segment 38 that is in the retracted position supported by support structure 92. Thereby, distal is defined as away from the baling chamber (where a proximal is close to the baling chamber).

FIG. 3 shows the bale discharge means in the retracted position, and shows how the roller 51 of the second segment 38 of the bale discharge means is supported by the support structure 92. The support structure 92 is located at an upper zone of the baling chamber 18. The support structure comprises a first protrusion 101 that is positioned to prevent rotation of the first segment 37. FIG. 4 illustrates how protrusion 101 prevents rotation of the first segment 37. Rotation of the first segment 37 would move the roller 51 in the direction of arrow 105. Such movement of the roller 51 is blocked by the protrusion 101, since the protrusion 101 obstructs such movement 105. The support structure further comprises a second protrusion 100 that is provided to prevent rotation of the second segment 38 out of the retracted position. A rotation of the second segment 38 would result in a movement of the roller 51 in the direction of arrow 106. Movement of the roller 51 in this direction 106 is prevented by the protrusion 100 since the protrusion 100 obstructs such movement 106.

The first and second protrusion 101, 100 define an opening 103 through which the roller 51 can enter and exit the support structure 92. As can be seen in FIG. 4 the roller 51 can enter and exit the support structure via opening 103 by a movement in the direction of arrow 107. Such movement in the direction of arrow 107 can only be obtained by a simultaneous rotation of the first segment 37 and the second segment 38.

The support structure further preferably comprises a guiding surface 102 for guiding the roller 51 towards the opening 103 of the support structure 92. This guiding surface 102 is preferably arranged to move the second segment 38 at least partially out of the retracted position just before entering the opening 103. This is illustrated in FIG. 2 by the path 108 that is followed by the roller 51 when the first segment 37 rotates from the extended to the retracted position. By bringing the second segment 38 at least partially out of the retracted position, the discharge means is given the opportunity to enter the support structure by simultaneously rotating the first and second segment 37, 38, at least for the last section of the movement.

From FIG. 3, it will become clear that shaking the agricultural baler in an up and down direction (due to driving the baler over an uneven ground surface) will have no significant impact on the rotation of the first segment 37. However such shaking of the baler will tend (without considering the support structure) to rotate the second segment 38 upwards (and out of the retracted position). However such movement is prevented by the second protrusion 100, and will therefore not lift the roller 51 out of the support structure 92. Since the roller 51 will not be lifted out of the support structure 92 due to the shaking of the agricultural baler, the first protrusion 101 can in all circumstances prevent the rotation of the first segment. Thereby, the bale discharge means is kept safely in the retracted position even when the agricultural baler is driven over an uneven ground surface. In this regard, it is noted that prior art balers who lack at least the second protrusion 100, thereby allow the second segment to rotate as a result of which the roller is lifted out of the support structure 92, and rotation of the first segment is not prevented anymore by the first protrusion 101 (since the roller does not lean to this protrusion anymore when lifted out of the support structure).

As can be seen in the figures, the support structure can be formed as a U-shaped element, the legs of the U-shaped element forming the first and second protrusion. The U-shaped element being oriented such that the roller can only enter between the two legs via a simultaneous rotation of the first and the second segment. In the configuration of the discharge means as shown in the figures, the U-shaped element is oriented with its legs extending upwards at an angle of about 45 degrees with respect to the horizontal plane.

The advantage of having a support structure with two protrusions 100, 101 defining an opening 103, is that no operator action is required for the discharge means to be held in the retracted position by the support structure. A simultaneous rotation of the roller 51 out of the support structure can easily be prevented, and be obtained, by the actuator 74 since the actuator actuates on the combined rotation of the first and the second segment. Where only a portion of the power of the actuator is available to counter the rotation of the first segment by itself or the rotation of the second segment by itself, the complete power is available to counter the combined rotation.

The above described embodiments and the shown figures are illustrative and serve only for a better understanding of the invention. The invention is not limited to the described embodiments. Different alternatives, and preferred features described in the text can be freely combined by a skilled person and developed in more detail to form an operational whole without departing from the essence of the invention. The scope of protection of the invention will therefore be defined solely by the claims.

The invention claimed is:

1. An agricultural baler comprising:
a baling chamber;
a pick-up for collecting crop material from a field and feeding it via conveyor into said baling chamber;
a tying mechanism for encircling a package with one or more strands of tying material thereby forming a completed bale; and
bale discharge arranged at an outlet of the baling chamber for receiving said completed bale, the bale discharge comprising a first segment, one end of which is rotatably connected to the baling chamber, and an opposite end of which is rotatably connected to a second segment of the bale discharge such that the bale discharge is moveable between an extended operating position and a retracted transporting position, wherein the bale discharge further comprises a support structure for supporting, in said retracted position, a component of said second segment, wherein said support structure comprises a first protrusion provided for preventing, in said retracted position, rotation of said first segment with respect to said baling chamber, wherein said support structure further comprises a second protrusion that is angled to extend rearward over an upper portion of the component of the second segment when in the retracted position, the second protrusion positioned for preventing, in said retracted position, rotation of said second segment with respect to said first segment, and wherein the angle of the second protrusion is configured to prevent the component of the second segment from moving upwardly out of an opening formed between the first and second protrusions.

2. The agricultural baler according to claim 1, wherein the opening provided so that the component can enter and exit the support structure by a combined rotation of said first and second segments.

3. The agricultural baler according to claim 2, wherein the combined rotation is a simultaneous rotation of the first segment with respect to the baling chamber and the second segment with respect to the first segment.

4. The agricultural baler according to claim 1, wherein the second segment comprises rollers provided for facilitating movement of said completed bale over said bale discharge.

5. The agricultural baler according to claim 4, wherein said component is formed by at least one of said rollers.

6. The agricultural baler according to claim 5, wherein said component is formed by a middle roller of said rollers.

7. The agricultural baler according to claim 1, wherein the first segment comprises rollers provided for facilitating movement of said completed bale over said bale discharge.

8. The agricultural baler according to claim 2, wherein said support structure further comprises a guiding surface for guiding said component towards said opening when the bale discharge is moved from the extended to the retracted position.

9. The agricultural baler according to claim 1, wherein the bale discharge further comprises an actuator extending between said baling chamber and said first segment, the actuator being adapted for moving at least said first segment from the extended position into the retracted position.

10. The agricultural baler according to claim 9, wherein said actuator is further connected to said second segment and further adapted for moving said second segment from the extended position into the retracted position.

11. The agricultural baler according to claim 1, wherein the support structure is arranged at an upper zone of the baling chamber.

12. The agricultural baler according to claim 1, wherein the support structure is generally formed as a U-shape, the two legs of the U-shape forming the first and second protrusions, the U-shape being oriented such that a rotation of only one of the first and second segment fails to move the component through the opening.

13. A bale discharge for an outlet of a baling chamber of an agricultural baler such that a completed bale can be received, the bale discharge comprising:
a first segment, one end of which is rotatably connectable to the baling chamber, and an opposite end of which is rotatably connected to a second segment such that the bale discharge is moveable between an extended operating position and a retracted transporting position;
a support structure for supporting, in said retracted position, a component of said second segment, wherein said support structure comprises a first protrusion provided for preventing, in said retracted position, rotation of said first segment with respect to said bale chamber bale, said support structure further comprising a second protrusion that is angled to extend rearward over an upper portion of the component of the second segment when in the retracted position, the second protrusion positioned for preventing, in said retracted position, rotation of said second segment with respect to said first segment, and wherein the angle of the second protrusion is configured to prevent the component of the second segment from moving upwardly out of an opening formed between the first and second protrusions.

14. The bale discharge according to claim 13, wherein the support structure is generally formed as a U-shape, the two legs of the U-shape forming the first and second protrusions, the U-shape being oriented such that a rotation of only one of the first and second segment does not move the component through the opening.

* * * * *